(12) United States Patent
Salomäki

(10) Patent No.: US 6,415,135 B1
(45) Date of Patent: Jul. 2, 2002

(54) TRANSMISSION PROTOCOL FOR FILE TRANSFER IN A DAB SYSTEM

(75) Inventor: Ari Salomäki, Järvenpää (FI)

(73) Assignee: Oy Nokia Ab, Espoo (FI)

( * ) Notice: Subject to any disclaimer, the term of this patent is extended or adjusted under 35 U.S.C. 154(b) by 0 days.

(21) Appl. No.: 08/981,052

(22) PCT Filed: Jun. 12, 1996

(86) PCT No.: PCT/FI96/00349

§ 371 (c)(1),
(2), (4) Date: Jan. 26, 1998

(87) PCT Pub. No.: WO96/42145

PCT Pub. Date: Dec. 27, 1996

(30) Foreign Application Priority Data

Jun. 12, 1995 (FI) ................................................. 952879

(51) Int. Cl.⁷ ................................................. H04B 1/00
(52) U.S. Cl. ...................... 455/45; 455/39; 455/186.1
(58) Field of Search ............................... 455/31.1, 31.2, 455/31.3, 39, 422, 517, 466, 45, 186.1; 340/825.44; 348/468, 473, 480, 482, 484, 487

(56) References Cited

U.S. PATENT DOCUMENTS

| | | | | | |
|---|---|---|---|---|---|
| 5,063,610 A | * | 11/1991 | Alwadish | ...................... | 455/45 |
| 5,239,540 A | * | 8/1993 | Rovira et al. | .................. | 455/45 |
| 5,400,401 A | | 3/1995 | Wasilewski et al. | ........... | 380/9 |
| 5,642,356 A | * | 6/1997 | Wenk | .......................... | 455/466 |
| 5,655,215 A | * | 8/1997 | Diachina et al. | ............ | 455/466 |
| 5,678,172 A | * | 10/1997 | Dinkins | ....................... | 455/466 |
| 5,696,760 A | * | 12/1997 | Hardin et al. | ................. | 455/466 |
| 5,822,700 A | * | 10/1998 | Hult et al. | ................... | 455/466 |
| 5,835,861 A | * | 11/1998 | Whiteside | .................... | 455/466 |

FOREIGN PATENT DOCUMENTS

| | | |
|---|---|---|
| EP | 0 306 208 A2 | 3/1989 |
| EP | 0 508 925 A2 | 10/1992 |
| EP | 0 508 928 A2 | 10/1992 |
| EP | 0 679 030 A2 | 10/1995 |

OTHER PUBLICATIONS

ETS 300 401, 1994, ETSI, "Basic DAB System Description", pp. 21–53.

* cited by examiner

Primary Examiner—Nay Maung
(74) Attorney, Agent, or Firm—Perman & Green, LLP

(57) ABSTRACT

The invention relates to the transmission of files in a digital broadcasting system, particularly in a DAB system according to the standard ETS 300 401. According to the invention, a file descriptor (16) is created for each file. This file descriptor is of the data group type denoted by 0011 in said standard and includes parameters (27) describing the file associated with the descriptor. The file descriptor is transmitted in the broadcasting system before the file and possibly also during the transmission of the file. The information to be transmitted is divided into segments, which are identified in a file-specifically unique manner, such as consecutive numbering, which starts from zero at the beginning of each file.

20 Claims, 3 Drawing Sheets

TRANSMISSION PROTOCOL FOR FILE TRANSFER IN A DAB SYSTEM

FIELD OF THE INVENTION

The invention relates to the transfer of files from a transmitting device to a receiving device in a digital telecommunication system in general and to a method of using a file mapping procedure mentioned but not strictly defined in the standard ETS 300 401 to transfer information associated with the files to be transferred.

BACKGROUND OF THE INVENTION

Digital Audio Broadcasting (DAB) is a new transmission system, which is expected in the long run to replace the broadcasting systems based on analog amplitude and frequency modulation, which are presently used in radio broadcasting to masses of people. The main features of the definitions concerning the DAB system are presented in the standard ETS 300 401 of the European Broadcasting Union (EBU) and the European Telecommunications Standards Institute (ETSI). In order to shed light on the background of the present invention, the features of the DAB system which are essential with regard to the invention will be presented briefly in the following.

Figure 1:
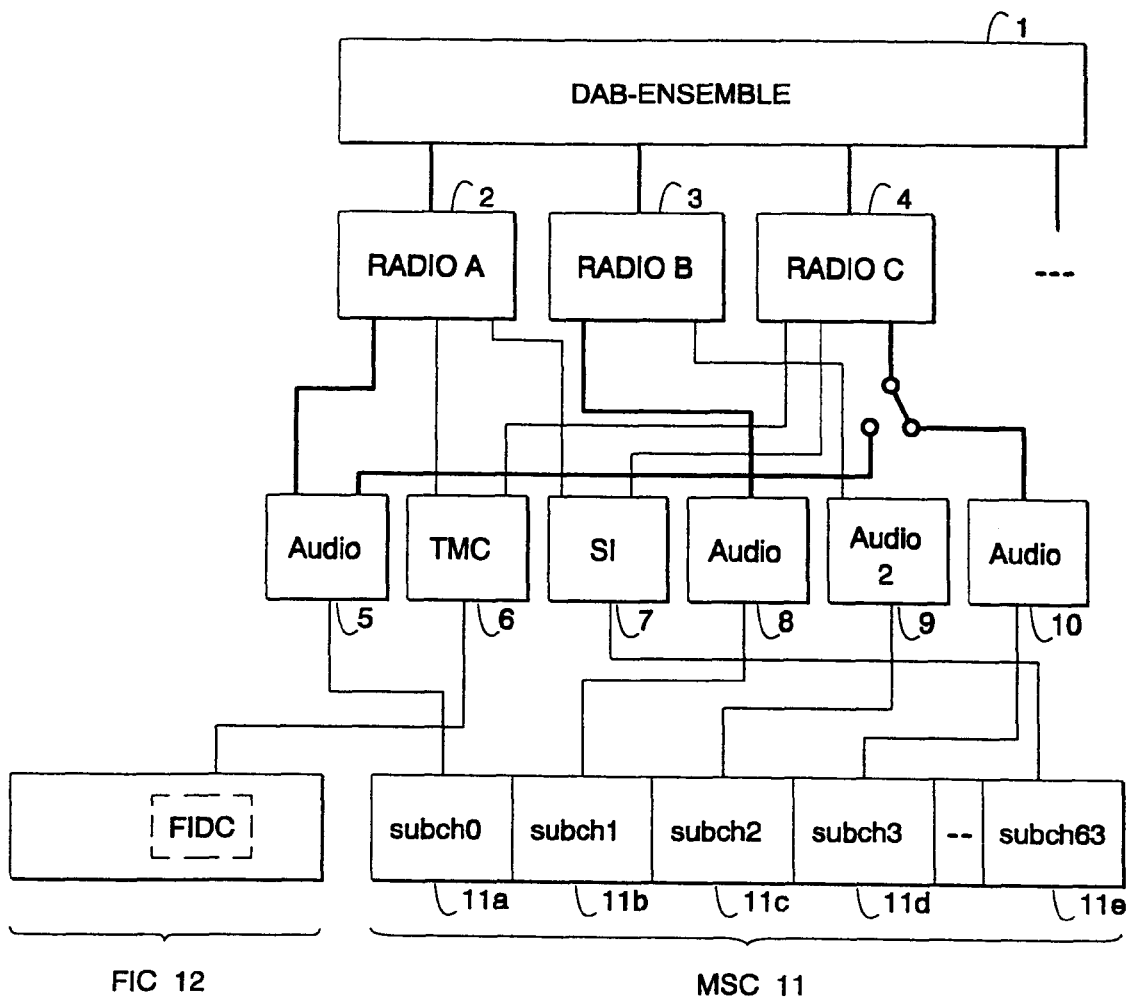

One signal stream transmitted by a transmitting device according to the standard forms a DAB ensemble, which can contain many services (2, 3, 4) as shown in FIG. 1. From the user's point of view, each service corresponds to one radio channel of the present systems, and it consists of one or more service components 5, 6, 7, 8, 9, 10. A single service component 5 can contain, for example, the audio part offered by the service 2, such as music, or a data part associated with it, such as the lyrics of the song being played, or other information associated with the service 2. One service component 6 can be a part of more than one service 2, 4. The service component, which is the most essential with regard to the service is called the primary service component, and the other service components which belong to the service are called secondary service components. The primary service component is often the audio part offered by the service, but it can also be a data part. The service can also contain many audio parts as service components. FIG. 1 shows the connection between each service (such as Radio A; 2) and its primary service component (in this case Audio; 5) with a thick line.

Figure 2:
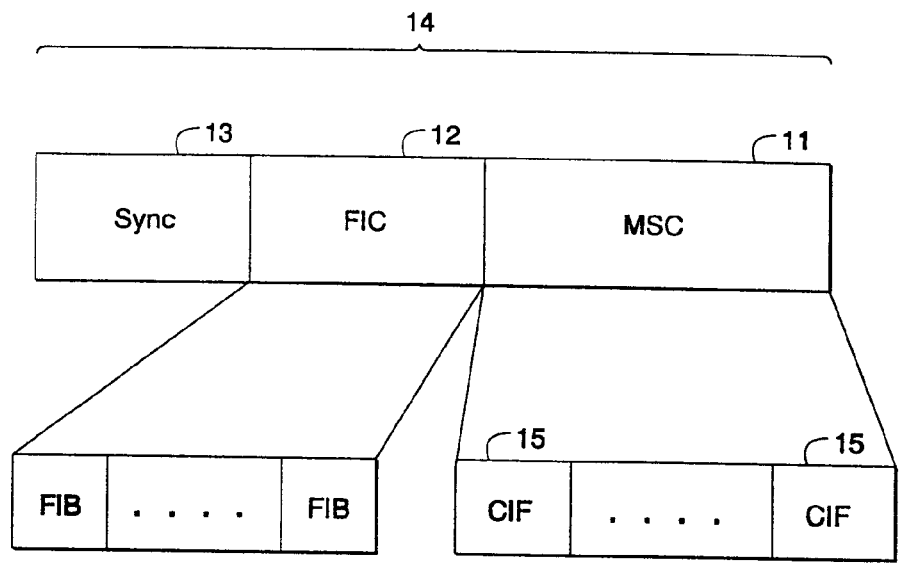

The information to be transmitted over the radio interface of the DAB system from the transmitter to the receiver is divided into three channels according to its purpose, as shown in FIG. 2. The channels are: Main Service Channel (MSC) 11, Fast Information Channel (FIC) 12 and Synchronization Channel 13. The service components 5 to 10 mentioned above are transmitted in the service channel 11, which is further divided into separate convolution-coded sub-channels (11a, 11b, 11c, 11d, 11e in FIG. 1). Each sub-channel can transmit one or more service components. The mutual order of the service components and the sub-channels is called multiplex configuration. The fast information channel 12 contains the multiplex configuration information (MCI) in particular, but it can also be used to transmit other information quickly from the transmitter to the receiver. The synchronization channel 13 is used to control the transmission and reception operation of the system, such as the synchronization of the transmission frames.

A DAB transmission consists of parts that are positioned hierarchically. The uppermost level of hierarchy is the transmission frame 14 according to FIG. 2, which contains a separate portion for each of the three channels 11, 12, 13. Only the portion of the service channel 11 is essential with regard to the invention, and it will be described in more detail in the following.

The portion of the service channel of the transmission frame consists of Common Interleaved Frames (CIF) 15, of which there are one or four, depending on the type of the transmission frame 14, and each of which contains 55296 bits. Each common interleaved frame 15 can be further divided into Capacity Units (CU), not shown in the figure, of which there are 864, each with a length of 64 bits. The capacity units are in the common interleaved frame 15, numbered consecutively so that the number or address of the first capacity unit is 0 and that of the last one is 863. The relation of the above mentioned sub-channels to the capacity units is such that one subchannel comprises an integer number of consecutive capacity units. One capacity unit can belong to one sub-channel only. If the sub-channels do not use all the capacity units of the common interleaved frame 15, the remaining capacity units are filled with padding bits, which are zeros.

Two transport modes have been defined for the service channel 11, namely the stream mode and the packet mode. Because the invention relates only to the use of the packet mode, only that will be described in the following.

When information to be transmitted in the service channel is formed and processed in the transmission equipment, it is handled as so called logical frames. One logical frame contains the amount of information associated with one service component, the presentation of which to the user takes 24 milliseconds. The number of bits contained by it depends on at which point of the transmission coding the logical frame is handled, and what is the bit rate associated with the subchannel used to transmit it. The information contained by each logical frame is, in the case of the packet mode, further grouped into packets, an integer number of which are incorporated in the logical frame. The length of the packets is 24, 48, 72 or 96 bytes, or 192, 384, 576 or 768 bits. Each packet comprises a packet header, which includes, among other things, a 10-bit address indicating which service component the information contained by the packet is associated with. In addition, each packet comprises a data field and a checksum field. All packets containing information relating to the same service component have the same address. The above mentioned multiplex configuration information MCI transmitted by the fast information channel contain links by which the addresses of the packets are associated with the corresponding service components.

For transmission, the packets are arranged in a manner presented in the standard ETS 300 401 to the above mentioned sub-channels. Each sub-channel can contain packets, which have the same or a different address. Within the service channel, packets with different addresses can be transmitted in any order, but the mutual order of packets with the same address, which refer to the same service component, must be retained.

Figure 3:
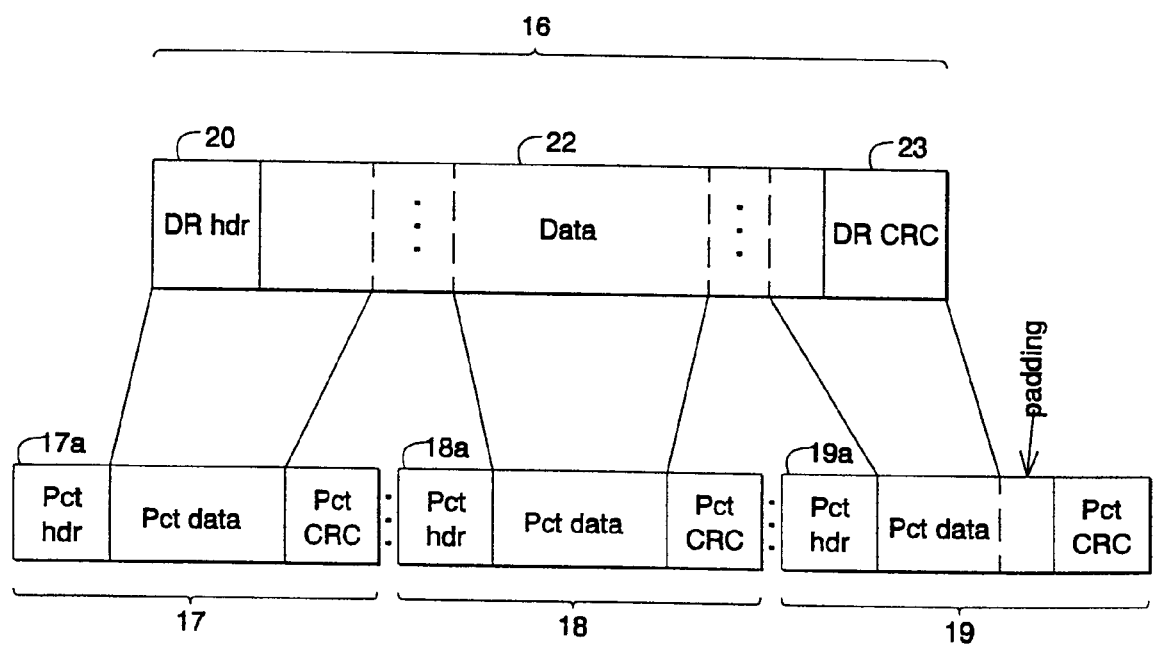

Information associated with the service components is related to the packets mentioned above in a manner such that data groups 16 according to FIG. 3 are formed thereof, and the data groups 16 are divided into parts for transmission, which parts are placed into packets 17, 18, 19, with the same address. It is for this reason that the mutual order of packets with the same address must be maintained: if the order is changed, the contents of the data group transmitted by the packets can no longer be reconstructed correctly. The first packet 17 transmitting the data group 16 contains an address (not shown) in its header 17a, which address is here denoted by j. Its header 17a also contains the information that it is the first packet of data group 17, which means that the so called First-bit of the header 17a is 1, and the so called Last-bit is 0. All the following packets 18, 19, which transmit the same data group 17, contain the same address j (not in the Figure) in their header 18a, 19a. In the header 19a of the last packet 19, the First-bit is 0 and the Last-bit is 1. In the header 18a of the packets 18 in between, both the First and Last bits are 0.

The internal construction of the data group 16 is of no importance with regard to packet switching, but it is of importance with regard to the invention, and so it is described in the following with reference to FIG. 4. At the beginning of the data group 16, there is a data group header 20, the length of which is 2 or 4 bytes, and thereafter possibly a session header 21, the length of which is not less than 3 and not more than 18 bytes, depending on the length of the address field 21f that may be contained in it. After that, there is a data group data field 22, the length of which is any integer number of bytes, but not more than 8191 bytes. The last one is a checksum field 23, if any, the length of which is 2 bytes. If the so called CRC flag bit 20b of the data group header 20 is 0, the data group 16 does not contain a checksum field.

The standard ETS 300 401 specifies how the bits of the data group header 20 are used to describe the contents of the data group 16. A part of the data group header 20, which is essential for the invention, is a four-bit code 20d indicating the type of the data group. If the four bits form the pattern 0011, data group 16 is of the file descriptor type, which is according to the above standard intended to describe the file to be transferred in the DAB system in order that the transfer would succeed. However, the standard does not specify the structure of a data group of the file descriptor type, and so file transfer in the DAB system is not defined merely on the basis of the existing standard.

Some procedures are known from other forms of digital data processing, in which procedures the nature of the data to be processed is described by headers or other auxiliary information. The patent specification U.S. Pat. No. 5,400,401 (Wasilewski et al; Scientific Atlanta Inc.) discloses a procedure in which data streams are transmitted as frames on the data transfer medium. For the transmission of the multiplexing order of the data streams, the system includes a multiplex control packet (or a virtual channel map packet), which describes the location of different services in the multiplexed stream. The purpose is that on the basis of information transmitted by this packet, the receiving device can pick the desired components from the data stream. The specification referred to does not describe the transfer of data in file form, but the transfer streams are essentially temporally continuous. The files essentially consist of the beginning, the middle part and the end, the identification of which is important in order to arrange the reception correctly.

The European patent applications EP 508 925 and EP 508 928 (IBM) disclose a method for transmitting multimedia data within a full-duplex data processing system. The system described by the applications is not of the broadcast service type, but it is constructed of local area networks and work-stations connected to them. The multimedia information can be of the stream or file type. The transfer forms include "video frame data", which can be considered to be of the stream type. In the IBM publications, the equivalent of a program is a "track", and a table describing the track order is called a "track collection index". In the publications, attention is paid to the effect of different playback rates on the transfer of audio and video components of multimedia. It is proposed in those publications that the "sequence index" describing the order of the components must contain, in addition to information of the mutual order of the components, also information of the correct playback rate of the components. The full duplexity of the data transfer provides many possibilities that do not exist in broadcast-type distribution, and so the method presented by these reference publications cannot be as such applied to the systems to which the invention relates.

SUMMARY OF THE INVENTION

It is an object of this invention to present a method for the transfer of information in file form in a DAB system, which preferably complies with the standard ETS 300 401. Another object of the invention is to present a method for implementing a file descriptor data group type referred to in the above standard. Furthermore, it is an object of the invention to present a method for implementing the data group type so as to enable successful file transfer in a DAB system.

The objects of the invention are achieved by dividing the file to be transferred into segments, which are numbered by file-specifically consecutive numbers, by setting the bits of the data group header suitably and by adding to the data group data field parameters describing the file to be transferred, such as a parameter indicating the number of the segments. The setting of the header bits as well as the parameters and their values will be described in more detail below.

A method according to the invention for transmitting a file in a digital broadcasting system is characterized in that a data element describing the file to be transmitted is created in the method, which data element has the same form as the data group used in the broadcasting system, and the data element is transmitted in the broadcasting system from the transmitter to the receiver.

The invention also relates to transmitter and receiver equipment, which participate in the file transfer by means of the method according to the invention. Transmitter equipment according to the invention is characterized in that it comprises means for arranging information describing the file into a data group of a predetermined form. Receiver equipment according to the invention is characterized in that it comprises means for interpreting information describing the file from a data group of a predetermined form.

In the system according to the invention, the information contained by the file is divided into segments for the transfer, and the segments are numbered consecutively within each file and transmitted one at a time from the transmitter to the receiver. In a broadcasting system using the method according to the invention, data groups of the file descriptor type are used to transmit the information associated with the files, and the data groups are added to the DAB transmission in a manner known as such. When files are being transferred, the data group of the file descriptor type is added according to the invention temporally at least immediately before the first segment of the file to be transferred next. In addition, the file descriptor data group can be transmitted a good time before the transfer of the file associated with it begins. The file descriptor data group can also be added to the DAB transmission in the middle of the transfer of the file associated with it.

Figure 4:
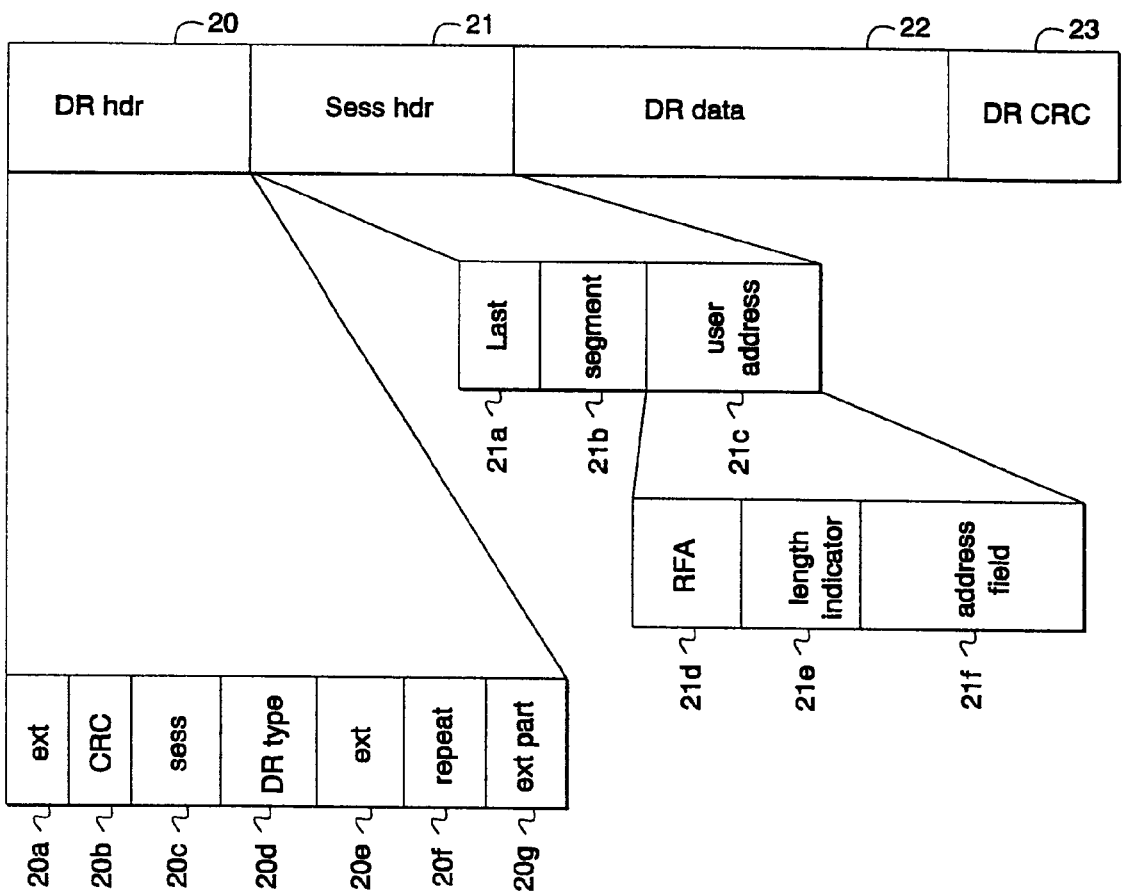
Figure 5:
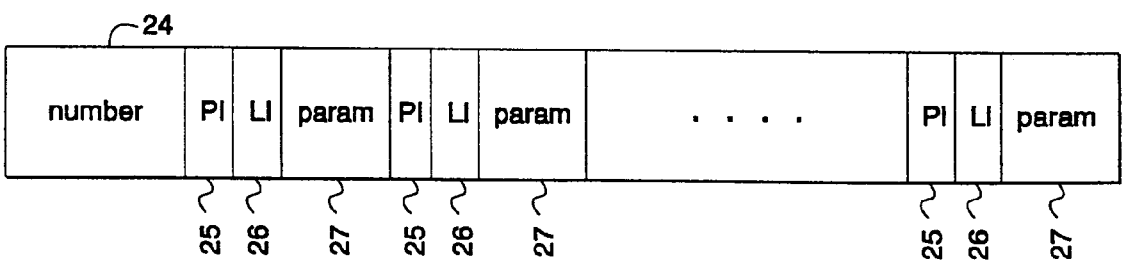

In the following, the invention will be described in more detail with reference to the accompanying drawings, in which FIG. 1 shows a known construction of a DAB ensemble, FIG. 2 shows a known transmission frame of a DAB system and its division into channels, FIG. 3 shows a known relation between a data group and packet structure of a DAB system in the packet mode, FIG. 4 shows a known structure of a data group of a DAB system, and FIG. 5 shows the data field structure of a data group according to the invention.

DETAILED DESCRIPTION OF THE PREFERRED EMBODIMENT

FIGS. 1 to 4 were referred to above in connection with the description of the prior art. In the following description of the invention, reference will mostly be made to FIGS. 4 and 5. In all the figures, the same reference numbers are used for corresponding parts. In the following, a data group of the file descriptor type according to the invention will be referred to as a file descriptor according to the invention.

In order to create a file descriptor according to the invention, the bits of the data group header 20, which as such comply with the standard, will be set as follows:

the extension flag 20 a is 0, the setting of the CRC flag 20b remains to be decided by the service provider; according to the standard the CRC flag 20b is 1 if the data group has a checksum field 23, and 0 if the data group does not have a checksum field, the session flags 20c are 10, if the file associated with the file descriptor does not contain an end user address, and 11 if the file associated with the file description contains an end user address, the data group type 20d is 0011, the continuity index 20e and the repetition index 20f are set as specified by the standard, and the extension field 20g is not used.

The bits of the session header 21, which comply with the standard as such, are set as follows in the file descriptor according to the invention:

the Last-flag 21a is always 0, the 15-bit segment number 21b is a running index, the value of which is increased by one when transmission of the last segment of each file being transmitted is completed; after the value corresponding to number 32767 of the decimal system, indexing is again started from 0, the four RFA bits 21d, reserved for future additions, are still reserved for future applications, the length indicator 21e is an unsigned four-bit integer with a value of 0 to 15, which indicates the length of the address field 21f in bytes and is the same as the length indicator of the file associated with the file descriptor, and the address field 21f is the same as the address field of the file associated with the file descriptor.

The data field 22 of a file descriptor according to the invention consists of a parameter count 24, parameter indicators (PI) 25, length indicators (LI) 26 and parameters 27. The length of the parameter count 24 is one byte and it indicates the number of parameters 27 included in the file descriptor as an unsigned integer, the maximum of which is 255. Each parameter 27 is associated with two descriptor values 25, 26, the first 25 of which is denoted by PI and the second 26 is denoted by LI, each of which has a length of one byte. The PI descriptor value 25 indicates the type of the next parameter 27 as an unsigned integer, the maximum of which is 255. The LI descriptor value 26 indicates the length of the next parameter 27 in bytes. The highest value of the length indicator 26, which has so far been used in the specification of the file descriptor according to the invention is 4, but nothing actually prevents the use of parameters longer than four bytes, as long as the total length of the data field 22 of the file descriptor does not exceed the maximum allowed 8191 bytes.

The file descriptor according to the invention includes obligatory, optional and application-specific parameters. In the preferred embodiment of the invention there are ten (10) obligatory parameters (PI descriptor values 0 to 9), 118 optional parameters (PI descriptor values 10 to 127), and 128 application-specific parameters (PI descriptor values 128 to 255). The obligatory parameters can advantageously be defined as follows:

Associated file: PI=0 and LI=1. A file descriptor according to the invention always describes a certain file, which is called the associated file. According to the invention, the file descriptor can be associated with a current file, whereby the file descriptor can be temporally placed at the beginning of the file or between the beginning and end of the file, or with a file to be transmitted in the future. It cannot be associated with a previously transmitted file. This parameter specifies the file associated with the file descriptor so that if the parameter value is 0, the file is a current file, and if the parameter value is 1, the file descriptor is associated with a file which is the next file following the current file and has the same address (21f in FIG. 4) as the file descriptor. If the parameter value is 2, the file descriptor is associated with a file which is the second file following the current file and has the same address (21f in FIG. 4) as the file descriptor and so on.

As has been shown above on page 6, the transfer of each file always starts with the file descriptor associated with the file. If the receiver receives a file descriptor earlier as an "advance warning", and the value of its parameter PI=0 is at least 1, so that the file descriptor is associated with a file to be transferred in the future, it can advantageously add the value of this PI=0 parameter to the segment number (21b in FIG. 4) of the file descriptor, considering the wrap phenomenon (returning of the segment number from 32767 to zero) and compare the value received to the segment number of each following file descriptor. The first file descriptor, the segment number of which is the same as the adding result obtained, indicates that the transmission of a file associated with the file descriptor received as an "advance warning" is about to begin. Thus the user can be informed of the file transfer well in advance, and he can then decide whether he wants to receive the file or not.

Number of remaining repetitions: PI=1 and LI=1. In many applications, files are transferred repeatedly without changing their contents between the repetitions. By using this parameter, the user can be advised as to how long the file to be transferred can be assumed to be available in unchanged form.

The obligatory parameters associated with the PI descriptor values 2 to 9 are reserved for future additions in the preferred embodiment of the invention. The optional parameters associated with the file descriptor according to the invention can be advantageously defined as follows:

File name: PI=10 and LI=defined by the service provider. The name of the file associated with the file descriptor is preferably transmitted as a character string, and it can be used in the receiver for file identification.

Object number: PI=11 and LI=2. Because the method according to the invention can preferably be applied to the transmission of multimedia programs in a DAB broadcasting network, certain reservations have been made in the primary embodiment of the file descriptor according to the invention in view of multimedia software. This parameter is the number of the multimedia object or item associated with the file to be transferred. The multimedia concepts as related to the invention will be described in more detail below.

Version number: PI=12 and LI=1. This parameter is a file-specifically running index, and its increments indicate that the contents of the associated file have changed after the previous transmission. If the file is transmitted frequently without sending any other file with the same address in between, the same function can also be implemented with the obligatory parameter "number of remaining repetitions" presented above.

File type: PI=13 and LI=1. This parameter can be used to indicate numbered file types. An undefined file type is preferably indicated by the parameter value 0. The file types will be described in more detail below, in connection with the multimedia description.

File size: PI=14 and LI=4. This parameter indicates the number of bytes of the associated file as an unsigned integer.

Segment count: PI=15 and LI=2. This parameter indicates the number of segments in the associated file as an unsigned integer. Because the segments are identified file-specifically, preferably by consecutive numbering, the end of the file is perceived when the number of the last segment corresponds to the number of segments given by the file descriptor.

The optional parameters associated with the PI descriptor values 16 to 127 are reserved for future additions in the preferred embodiment of the invention.

Because the method according to the invention, or the use of file descriptors according to the invention to transmit information associated with the files to be-transmitted is particularly suited for the transmission of multimedia programs in a DAB broadcasting system, the principles of multimedia with regard to the invention will be described in the following. According to the known definition, multimedia means the presentation of synchronized audiovisual items to the user. The items can be streams, whereby the temporal length of the item is the same as the length of the multimedia program, pieces of stream, whereby the temporal length of the item is shorter than the length of the multimedia program, or files, whereby each file can be regarded as a part of the file stream.

As is known, the item must contain information to be presented to the user, whereby the items are a subset of a more extensive object concept. Objects, which are not items, can contain control logic for the synchronization of the items or for influencing the form of the presentation. It is further possible to separate from the items a subset of downloadable items, a common feature of which is the fact that they are stored in the memory of the receiver and presented as part of the multimedia program when a certain trigger condition is met. A multimedia program is defined as a presentation containing at least one downloadable item.

With regard to the broadcasting method according to the invention, it is possible to define three types of programs, which differ from one another in regard to the broadcasting requirements:

The program does not contain downloadable items. According to the above definition, this is not a multimedia program and it does not require file transfer.

The program contains one or more streams and one or more downloadable items. The program can be a piece of music, for example, with one or more still images to be transmitted as files, which are presented to the user on the display unit of the receiver in connection with certain points in the music. In order that the user might "come along" quickly also when he begins the reception in the middle of the program, the transmission must contain repetition of files. The repetition procedure can be controlled by the parameters "number of remaining repetitions" and "version number" or corresponding parameters taken from the reservations made for future additions.

The program contains downloadable items only. Files that contain parts of programs can conveniently be at first transmitted in their entirety from the transmitter to the receiver and be stored in the memory before they are presented to the user. In order to transmit a program like this, it is typically necessary to transmit many files, for which purpose the following parameters can be advantageously included in the file descriptor according to the invention:

File group name: PI=16 and LI=defined by the service provider. When the files are arranged into groups, this parameter is used to identify the file groups.

Number of remaining repetitions of the group: PI=17 and LI=1. On the file group level, this parameter corresponds to the number of remaining repetitions of the file, as presented above. File repetition can take place regardless of the group repetition, and between the number of group repetitions, the number of file repetitions and the order of files within the group can change.

Group version number: PI=18 and LI=1. On the file group level, this parameter corresponds to the file version number as presented above.

Last file of the group: PI=19 and LI=1. It is advantageous for the receiver to know which file of the group is the last file. Preferably, the value 0 of this parameter means that the associated file is not the last file of the group, and correspondingly the value 1 means that the associated file is the last file of the group.

Multimedia programs and data services set different requirements for the equipment connected to the receiver, such as memory, loudspeakers, display units and other equipment of the user interface. To advantage, the multimedia or data service transmission includes a file containing information of the hardware resources required by the program or service. For this purpose, it can advantageously be specified for the file type parameter (PI=13 and LI=1) of the file descriptor according to the invention that the value 1 corresponds to a file containing information associated with the hardware resources required.

An essential part of multimedia programs and data services are the starting procedures (scripts), which can be implemented in many ways. If information about the starting procedure is transmitted in file form, it is advantageous for the receiver to identify which file contains this information. For this purpose, it can preferably be specified for the file type parameter (PI=13 and LI=1) of the file descriptor according to the invention that its value 2 corresponds to a file containing information about the starting procedure of the service. The same applies to the synchronization functions of a multimedia program.

All the data processing procedures presented above, which relate to file transfer in a broadcasting system according to the DAB standard and particularly to the arrangement of information describing the file as a data group with a standardized form, which was designated above as a file descriptor according to the invention, can be advantageously implemented by programming instructions of the procedures in a computer. Programming of this kind is a technique known to a person skilled in the art. Similarly, interpretation of information about the file, which takes place in the receiver, is preferably carried out by a computer.

The invention suggests for the first time how a file descriptor data group mentioned but not specified in the DAB standard ETS 300 401 can be formed advantageously. The invention thus enables the transfer of files in a DAB system. In addition, the division of the file into segments and the indication of the number of segments in the file descriptor according to the invention facilitates the file transfer. Because the file descriptor according to the invention provides the possibility of transmitting obligatory, optional and application-specific parameters describing the file, it offers versatile means for transmitting multimedia objects, for example, in a DAB system.

What is claimed is:

1. A method for transmitting information in a broadcast-type digital telecommunication system using Digital Audio Broadcasting from a transmitter to a receiver, which information is in the form of a file with a beginning, end and a middle part, and in which telecommunication system data groups of a predetermined form are formed of the information to be transmitted in the system, wherein a data element (16) describing the file to be transmitted is created in the method, which data element has the same form as the data group used in the telecommunication system and includes mechanisms for indicating at least the beginning and the end of said file, including a selectable number of additional parameters (27) describing said file and indicating the number and size of the additional parameters included in the data element, and which data element (16) is transmitted in said telecommunication system from said transmitter to said receiver.

2. A method according to claim 1, wherein said data element (16) is transmitted in said telecommunication system from said transmitter to said receiver essentially earlier than said file.

3. A method according to claim 1, wherein said data element (16) is transmitted in said telecommunication system from said transmitter to said receiver immediately before said file.

4. A method according to claim 1, wherein said data element (16) is also transmitted in said telecommunication system from said transmitter to said receiver at least once during said file transmission.

5. A method according to claim 1, wherein said file is also divided into segments, each of which segments is identified in a file-specifically unique manner.

6. A method according to claim 1, wherein said parameters (27) comprise a first parameter, which has a multitude of allowed values, the first of which indicates that the file associated with said data element (16) is currently being transmitted from said transmitter to said receiver, and the other values indicate that the file associated with said data element (16) will be transmitted later from said transmitter to said receiver.

7. A method according to claim 1, wherein said parameters (27) comprise a parameter, which indicates the number of times left for said file to be transmitted in an unchanged form from said transmitter to said receiver.

8. A method according to claim 1, wherein said parameters (27) comprise a parameter, which indicates the name of said file.

9. A method according to claim 1, wherein said file is associated with a multimedia object and said parameters (27) comprise a parameter, which indicates the number of the multimedia object that said file is associated with.

10. A method according to claim 1, wherein said parameters (27) comprise a parameter, which indicates which version of said file is transmitted.

11. A method according to claim 1, wherein said parameters (27) comprise a parameter, which indicates the type of information contained by said file.

12. A method according to claim 1, wherein said parameters (27) comprise a parameter, which indicates the size of said file.

13. A method according to claim 1, wherein said parameters (27) comprise an parameter, which indicates the file group to which said file belongs.

14. A method according to claim 1, wherein said parameters (27) comprise a parameter, which indicates the number of times left for the file group of said file to be transmitted in an unchanged form from said transmitter to said receiver.

15. A method according to claim 1, wherein said parameters (27) comprise a parameter, which indicates which version of the file group of said file is transmitted.

16. A method according to claim 1, wherein said parameters (27) comprise a parameter, which indicates whether said file is the last file of the file group to which it belongs.

17. Equipment for transmitting information in digital form using Digital Audio Broadcasting, which information is in the form of a file with a beginning, end and a middle part therebetween, and which equipment comprises means for arranging the information into data groups of a predetermined form for transmission, wherein it also comprises means for arranging information describing said file into a data element (16) describing the file to be transmitted, which data element has the same form as the data groups of a predetermined form and includes mechanisms for indicating at least the beginning and the end of said file, including a selectable number of additional parameters (27) describing said file and indicating the number and size of the additional parameters included in the data element.

18. Equipment according to claim 17, further comprising means for dividing said file into segments and for identifying said segments for said transmission.

19. Equipment for receiving information transmitted in digital form, using Digital Audio Broadcasting, which information is in the form of a file with a beginning, end and a middle part in between, and which equipment comprises means for interpreting information from the data groups of a predetermined form, further comprising means for interpreting information describing said file from a data group (16) of a predetermined form, which information includes mechanisms for indicating at least the beginning and the end of said file, indicating a selectable number of additional parameters (27) describing said file and indicating the number and size of the additional parameters included in the data group.

20. Equipment according to claim 19, further comprises means for compiling said file from segments transmitted one by one.

* * * * *